(12) United States Patent
Green

(10) Patent No.: US 9,247,693 B2
(45) Date of Patent: Feb. 2, 2016

(54) IRRIGATION SYSTEMS

(71) Applicant: Johnny Green, Hobbs, NM (US)

(72) Inventor: Johnny Green, Hobbs, NM (US)

( * ) Notice: Subject to any disclaimer, the term of this patent is extended or adjusted under 35 U.S.C. 154(b) by 94 days.

(21) Appl. No.: 14/153,237

(22) Filed: Jan. 13, 2014

(65) Prior Publication Data

US 2015/0196001 A1 Jul. 16, 2015

(51) Int. Cl.
*A01G 25/02* (2006.01)
*A01G 25/09* (2006.01)

(52) U.S. Cl.
CPC ............... *A01G 25/09* (2013.01); *A01G 25/02* (2013.01); *A01G 25/097* (2013.01)

(58) Field of Classification Search
USPC ........................................................ 239/738
See application file for complete search history.

(56) References Cited

U.S. PATENT DOCUMENTS

| | | | | |
|---|---|---|---|---|
| 3,942,722 A * | 3/1976 | Ede | ............................ | 239/102.1 |
| 4,230,272 A * | 10/1980 | Snell | ............................ | 239/121 |
| 6,604,697 B1 * | 8/2003 | Heren et al. | ................... | 239/723 |
| 7,182,274 B2 * | 2/2007 | Nies | ............................ | 239/198 |
| 2011/0309171 A1 * | 12/2011 | McConnell | ................... | 239/726 |

* cited by examiner

*Primary Examiner* — Benjamin Fiorello
*Assistant Examiner* — Kyle Armstrong
(74) *Attorney, Agent, or Firm* — Fish & Richardson P.C.

(57) ABSTRACT

The disclosure features irrigation systems that include a base unit featuring a retractable fluid conduit, and a mobile unit coupled to the fluid conduit and including: a main body featuring an internal fluid channel having an opening; a plurality of wheel supports rotatably coupled to the main body, where the internal fluid channel extends through the wheel supports to a first plurality of apertures; two or more wheels coupled to the plurality of wheel supports; and a second plurality of apertures extending from the internal fluid channel through a wall of the main body, where during operation of the irrigation system, water enters the internal fluid channel through the opening and is dispensed from the first and second pluralities of apertures.

20 Claims, 8 Drawing Sheets

IRRIGATION SYSTEMS

TECHNICAL FIELD

This disclosure relates to systems for delivery of water and chemical substances to a variety of landscapes.

BACKGROUND

Conventional in-ground irrigation systems consist of a network of pipes, sprinkler heads, valves, and other fittings to deliver water to gardens and other landscapes. The pattern in which water is delivered is pre-determined by the layout of such systems; because they are installed below grade they are not generally not re-configurable without a significant expenditure of time and money.

Water delivery in conventional irrigation systems typically occurs through one or more sprinkler heads positioned close to grade level. To deliver water to a wide area, streams of water project upward and outward from the sprinkler heads. In some cases, supply water is provided at sufficient pressure so that no additional pressurization of the stream is needed to achieve a desired coverage of the landscape. In other cases, the supply water is pressurized further before delivery through the sprinkler heads to ensure adequate coverage of the landscape.

SUMMARY

This disclosure features systems and methods for irrigating a wide variety of landscapes. The systems are self-propelled and require no external power source to operate. Further, the systems deliver water in a downward-directed spray, which irrigates landscapes in a more efficient manner than conventional sprinkler-based systems. As a result, irrigation times are reduced and the amount of water used is significantly reduced.

The systems and methods disclosed herein are configurable so that a wide variety of landscapes can be irrigated. In particular, water delivery patterns can be selected as desired simply be re-routing a hose or other guide member. As a result, the systems disclosed herein can be adapted for irrigation of a wide variety of landscapes, including lawns, gardens, commercial production fields, greenhouses, and more generally, tracts of land of varying shapes and sizes.

In general, in a first aspect, the disclosure features irrigation systems that include a base unit featuring a retractable fluid conduit, and a mobile unit coupled to the fluid conduit and including: a main body featuring an internal fluid channel having an opening; a plurality of wheel supports rotatably coupled to the main body, where the internal fluid channel extends through the wheel supports to a first plurality of apertures; two or more wheels coupled to the plurality of wheel supports; and a second plurality of apertures extending from the internal fluid channel through a wall of the main body, where during operation of the irrigation system, water enters the internal fluid channel through the opening and is dispensed from the first and second pluralities of apertures.

Embodiments of the systems can include any one or more of the following features.

The systems can include an impeller coupled to each one of the two or more wheels through a subset of the plurality of wheel supports, where during operation of the irrigation system, the water propels the mobile unit by applying a force to each impeller. The mobile unit can include a guide channel, and during operation of the irrigation system, the mobile unit can follow a guide member positioned in the guide channel.

The second plurality of apertures can be positioned so that during operation of the irrigation system, water is dispersed in a downward direction onto a landscape surface from the second plurality of apertures. The retractable fluid conduit can include a flexible tube.

The base unit can include a retracting mechanism for storing the fluid conduit in retracted form. The retracting mechanism can include a rotating shaft around which the fluid conduit is wound. The base unit can include a member with an internal fluid channel, and the retracting mechanism can be detachably coupled to the member. The internal fluid channel in the base unit can extend from the member through the retracting mechanism and into the fluid conduit.

The systems can include a pressure regulator configured to control a pressure of the water. The systems can include a fluid reservoir connected to the internal fluid channel of the base unit, where during operation of the irrigation system, the water can flow through the fluid reservoir before entering the internal fluid channel of the base unit.

The guide channel can be formed by two guide wheels spaced apart from one another. The guide member can include a hose. The guide member can include one or more guide wires.

Embodiments of the systems can also include any of the other features disclosed herein, in any combination, as appropriate.

In another aspect, the disclosure features irrigation systems that include a stationary base unit, a fluid conduit connected to the base unit, and a mobile unit connected to the fluid conduit and featuring two or more drive wheels connected to a fluid channel and two or more guide wheels, where during operation of the irrigation system, water supplied from the base unit enters the fluid channel of the mobile unit and propels the two or more drive wheels, and the mobile unit follows a path corresponding to a hose positioned between the two or more guide wheels.

Embodiments of the system can include any one or more of the following features.

The systems can include two or more impellers, where each one of the two or more impellers can be connected to a corresponding one of the two or more drive wheels, and where each of the two or more impellers can be positioned within the fluid channel. Each one of the two or more impellers can be connected to a corresponding one of the two or more drive wheels through a plurality of wheel supports, where the fluid channel extends through each of the wheel supports, and where during operation of the irrigation system, a portion of the water is dispensed from apertures located in the wheel supports.

The systems can include a plurality of apertures connected to the fluid conduit, where during operation of the irrigation system, a portion of the water is dispensed from the plurality of apertures. At least some of the plurality of apertures can be positioned on an underside of the mobile unit.

The base unit can include a retracting mechanism for storing the fluid conduit in retracted form, and during operation of the irrigation system, the retracting mechanism can dispense the fluid conduit as the mobile unit follows the path.

Embodiments of the systems can also include any of the other features disclosed herein, in any combination, as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Conventional in-ground irrigation systems, as described above, are typically installed in a fixed configuration below grade level in landscape environments. Such installations are typically costly and prone to component failure. To conduct repairs, portions of such systems are generally exposed by digging below grade, a process that is time-consuming and can also be costly. Modifications to in-ground systems can also entail significant time and expense, as they typically involve similar excavation and plumbing. Moreover, even above-ground installations involve periodic replacement of plumbing fixtures and maintenance of components, and likewise have fixed configurations relative to landscape environments.

In addition, many conventional in-ground and above-ground irrigation systems deliver water to the landscape environment by spraying the water upward and outward using nozzles, sprinklers, and similar water dispersing fixtures. Much of the water sprayed in this manner is atomized and drifts away as water vapor, rather than being delivered to the landscape. This is particularly prevalent in hot and arid environments, which promote rapid evaporation of water. In such systems, therefore, significant quantities of water can be lost to the environment without being delivered to the landscape, resulting in inefficient delivery of supply water.

The systems and methods disclosed herein are relatively simple in construction. Compared to many conventional systems, they have fewer components, and are therefore less costly and time-consuming to maintain. Moreover, the systems are re-configurable to allow for a wide range of patterns of water delivery to a landscape. Water is delivered in an efficient manner by directing the water downwards toward the landscape rather than upward and outward, and the direction of water delivery can be controlled in a simple manner to accurately deliver water where it is needed, and to avoid delivering (e.g., wasting) water where it is not needed.

Figure 1:
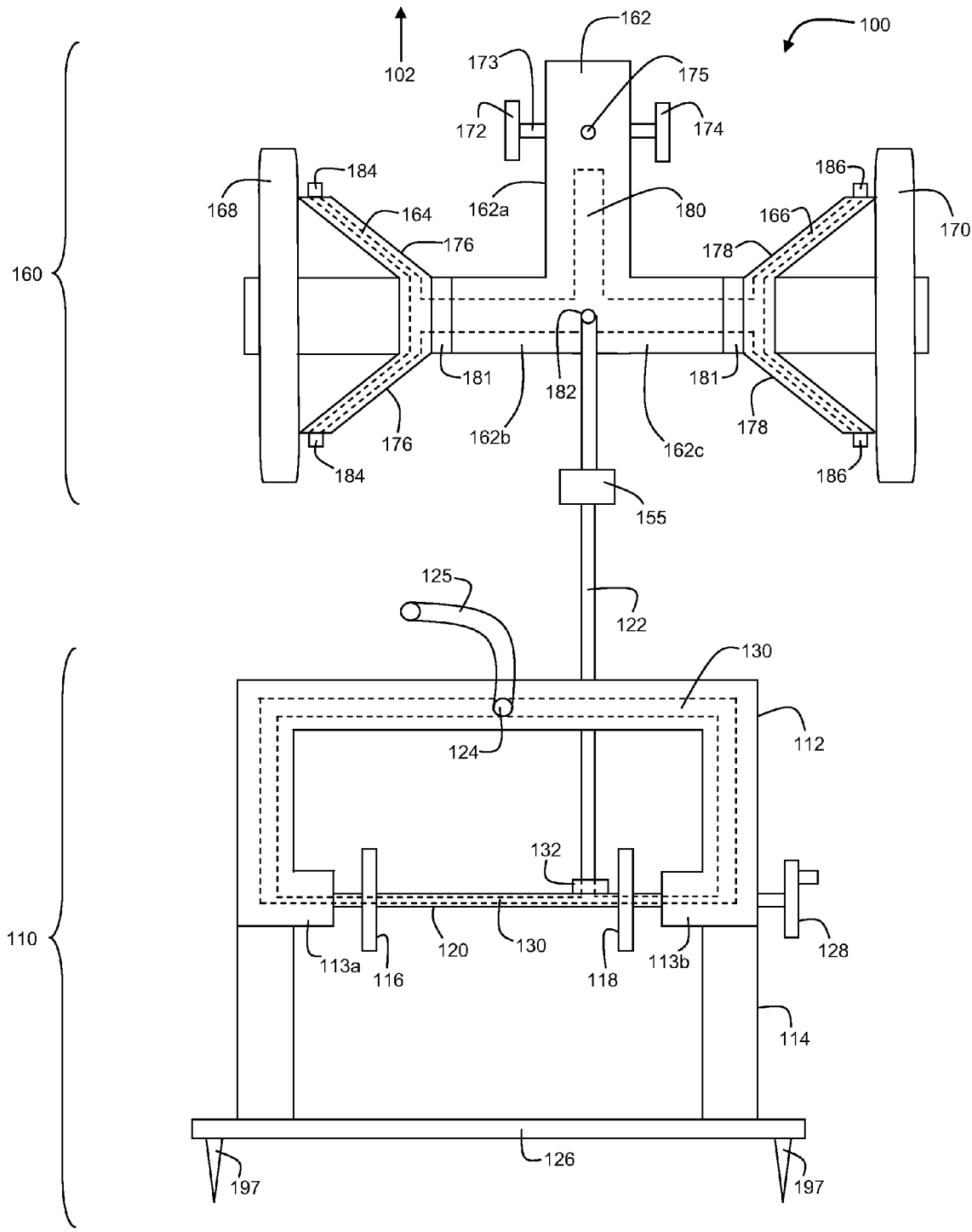
FIG. 1 is a schematic diagram of an irrigation system.

FIG. 1 shows a schematic diagram of an irrigation system 100. Irrigation system 100 includes a base unit 110 and a mobile unit 160. Base unit 110 includes a support structure featuring an upper member 112 and a lower member 114 connected to the upper member. Lower member 114 is mounted on a support platform 126. Upper member 112 includes a rotating shaft 120 that is connected to, and rotates freely within, arms 113a and 113b of upper member 112. Two conduit retainers 116 and 118 are connected to rotating shaft 120, and rotate when the shaft is rotated. A handle 128 (e.g., implemented as a hand crank) is connected to rotating shaft 120 on the opposite side of arm 113b from conduit retainer 118, and also rotates when shaft 120 is rotated.

Upper member 112 also includes a connector 124 configured to releasably connect to a fluid conduit such as a hose 125 (e.g., a common half-inch diameter garden hose). An internal fluid channel 130, indicated by dashed lines in FIG. 1, extends from connector 124 through the upper portion of member 112, through each of arms 113a and 113b, and into rotating spindle 120. Fluid channel 130 is also connected to connector 132. A fluid conduit 122 (e.g., a length of tubing) is connected to connector 132. As a result, a continuous fluid channel is established between connector 124 and connector 132, so that a fluid (e.g., water) that enters base unit 110 through connector 124 (e.g., water delivered to base unit 110 from hose 125) exits base unit 110 through connector 132 and enters fluid conduit 122. As shown in FIG. 1, fluid conduit 122 is connected to mobile unit 160.

Mobile unit 160 includes a main body 162. A plurality of wheel supports 176 and 178 are connected to, and rotate freely about, main body 162. A wheel 168 is connected to wheel supports 176 and rotates relative to main body 162 when wheel supports 176 rotate relative to main body 162. Similarly, a wheel 170 is connected to wheel supports 178 and rotates relative to main body 162 when wheel supports 178 rotate relative to main body 162. An axle 173 is connected to a shaft 175 that extends through main body 162. Axle 173 rotates freely about shaft 175 so that axle 173 can rotate through an angle of 360° relative to main body 162. Wheels 172 and 174 are connected to, and rotate freely about, axis 173.

As shown in FIG. 1, fluid conduit 122 is connected to an aperture 182 formed in main body 162. Aperture 182 is connected to an internal fluid channel 180 that extends through main body 162. In particular, fluid channel 180 extends through neck 162a and through arms 162b and 162c of main body 162. Within neck 162a, fluid channel 180 is connected to one or more apertures that extend through main body 162 (the apertures are not shown in FIG. 1, but will be discussed in greater detail later).

Fluid channel 180 extends through arm 162b and into each of wheel supports 176, terminating at apertures 184 formed in wheel supports 176. Similarly, fluid channel 180 extends through arm 162c and into each of wheel supports 178, terminating at apertures 186 formed in wheel supports 178. Apertures 184 and 186 are open to the environment surrounding mobile unit 160.

During operation, supply water enters aperture 24 of base unit 110. For example, hose 125 can be connected to aperture 124, and supply water can be delivered to aperture 124 through hose 125. Typically, supply water is delivered from a common faucet connected to a municipal water supply system. The supply water generally has a static pressure of between about 20 pounds per square inch (PSI) and about 75 PSI. The pressure of the supply water can be adjusted, as needed, by directing the supply water to flow through a pressure regulating device (e.g., a pump to increase the pressure, or a pressure reducer to decrease the pressure) before the supply water enters aperture 124.

After entering base unit 110 through aperture 124, the supply water flows through fluid channel 130 in the upper portion of upper member 112, and through the portions of fluid channel 130 that extend through arms 113a and 113b of upper member 112. The supply water then flows through shaft 120 and exits base unit 110 through connector 132, entering fluid conduit 122.

The supply water propagates through fluid conduit 122 and enters main body 162 of mobile unit 160 through aperture 182. Once inside main body 162, the supply water flows through fluid channel 180 and into neck 162a of main body 162. The supply water exits main body 162 through the one more apertures that are connected to fluid channel 180 in neck 162a (not shown in FIG. 1).

A portion of the supply water also flows through fluid channel 180 and into arms 162b and 162c of main body 162. The supply water continues to flow through fluid channel 180 within wheel supports 176, and exits the wheel supports through apertures 184. In addition, the supply water flows through fluid channel 180 within wheel supports 178, and exits the wheel supports through apertures 186.

Figure 2:
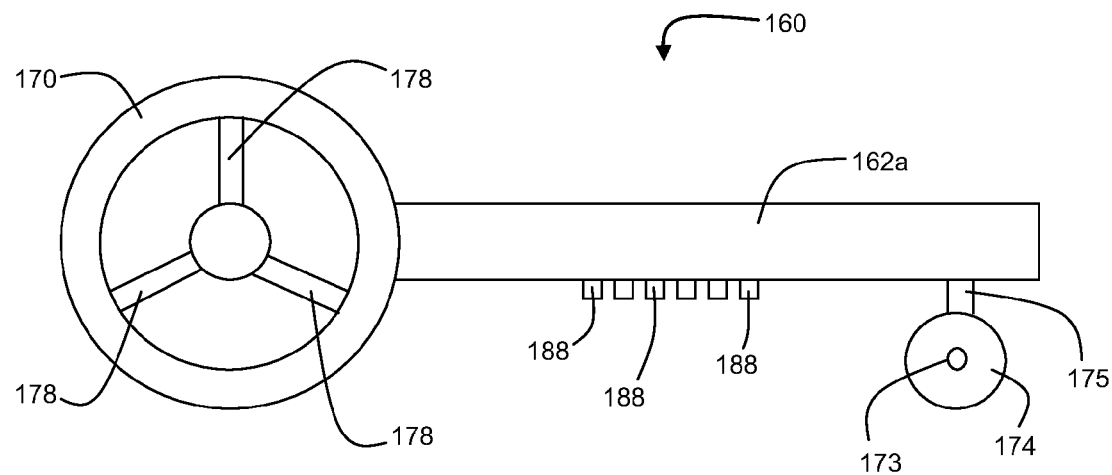
FIG. 2 is a schematic diagram of a mobile unit of an irrigation system.

FIG. 2 is a schematic side view of mobile unit 160. In FIG. 2, apertures 188 are shown on the underside of neck 162a of main body 162. As discussed above, apertures 188 are in fluid communication with fluid conduit 180 so that water and/or other fluids that flow through conduit 180 can exit main body 162 through apertures 188 on the underside of neck 162a. Also shown in FIG. are apertures 186 positioned at the ends of wheel supports 178, which are also in fluid communication with conduit 180. When water and/or other fluids flow through conduit 180, the water and/or other fluids can exit wheel supports 178 through apertures 186.

Referring again to FIG. 1, during operation of system 100, supply water flows from base unit 110 to mobile unit 160. As the pressurized supply water flows through fluid channel 180 in main body 162, the water passes through impellers 181 in arms 162b and 162c of main body 162. Impellers 181 are configured so that when the pressurized water contacts the impellers, the impellers rotate wheel supports 176 and 178 in a single direction with respect to arms 162b and 162c. In particular, when pressurized water flows through impellers 181 on the way to apertures 184 and 186, impellers 181 rotate wheel supports 176 and 178 in a forward direction. Wheels 168 and 170, which are connected to wheel supports 176 and 178, respectively, also rotate in a forward direction. As a result, the entire mobile unit 160 moves in a forward direction, i.e., in the direction of arrow 102 in FIG. 1.

Figure 3:
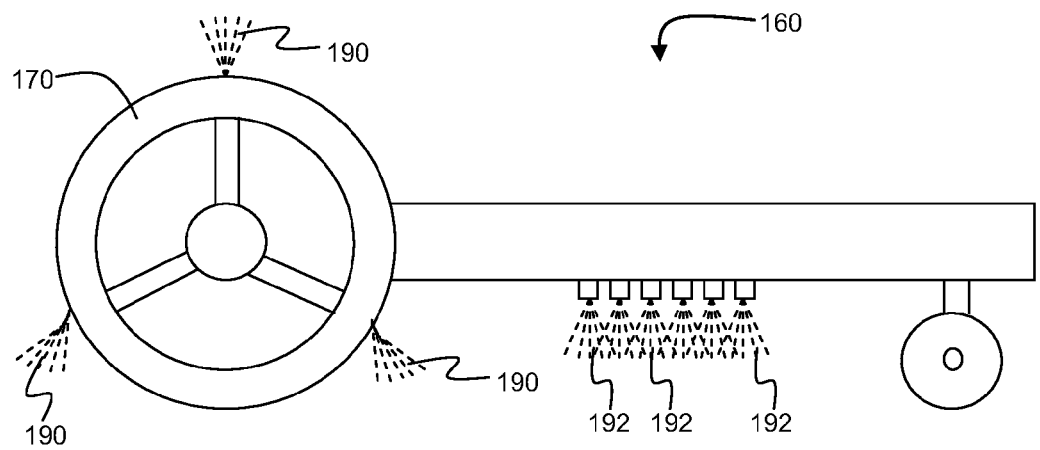
FIG. 3 is a schematic diagram of the mobile unit of FIG. 2 during operation of the irrigation system.

As the pressurized supply water flows through fluid channel 180, the water exits main body 162 through the various apertures discussed above. FIG. 3 shows a schematic side view of mobile unit 160 during operation. As is evident in FIG. 3, supply water exits main body 162 through apertures 188 formed in neck 162a, in a plurality of streams 192. Streams 192 are directed downwards toward the surface (e.g., the landscape grade) on which wheels 168, 170, 172, and 174 rest.

Supply water also exits main body 162 through apertures 184 and 186 in wheel supports 176 and 178, respectively, in a plurality of streams 190. As shown in FIG. 3, streams 190 are directed approximately orthogonal to the ground-contacting surfaces of wheels 168 and 170. Because wheels 168 and 170 are in continuous rotation as mobile unit 160 moves forward, much of the water in streams 190 flows approximately in a direction toward the surface (e.g., the landscape grade) on which wheels 168, 170, 172, and 174 rest.

As discussed previously, directing the flow of streams 190 and 192 toward the landscape that is being watered, rather than dispersing the water upward into the air as in many conventional irrigation systems, provides a number of important advantages. First, water can be applied to the landscape in more targeted fashion, ensuring that water is delivered to only those portions of the landscape for which irrigation is desired. Because water is not dispersed in a wide-area, indiscriminate spraying pattern, highly controlled irrigation can be achieved.

Second, because water is applied in controlled fashion, a significant amount of water is saved relative to many conventional irrigation systems. Accordingly, a smaller volume of water can be used to irrigate landscapes than when using conventional systems. Water savings arise from the targeted delivery of water to only those portions of the landscape where irrigation is desired; water is not wasted by applying it to portions of the landscape where no irrigation is intended. Further, in hot, arid climates, water savings arise because significantly smaller quantities of water are dispersed upward into the air, relative to conventional systems. Dispersal of water into the air in hot, arid environments can lead to a significant fraction of the dispersed water evaporating before it effectively irrigates the landscape. System 100 avoids much of this evaporation by delivering water in a downward direction, directly onto the portions of the landscape for which irrigation is desired.

As discussed above, when pressurized supply water flows through fluid channel 180, the water drives impellers 181, which in turn cause wheel supports 176 and 178, and wheels 168 and 170 attached thereto, respectively, to rotate in a forward direction, causing mobile unit 160 to move forward. The pattern traveled by mobile unit 160 over the landscape surface is entirely configurable, and can be modified simply and easily prior to, or during, movement of mobile unit 160. In particular, the entire pattern of travel of mobile unit 160 can be controlled using a common garden hose.

Figure 4:
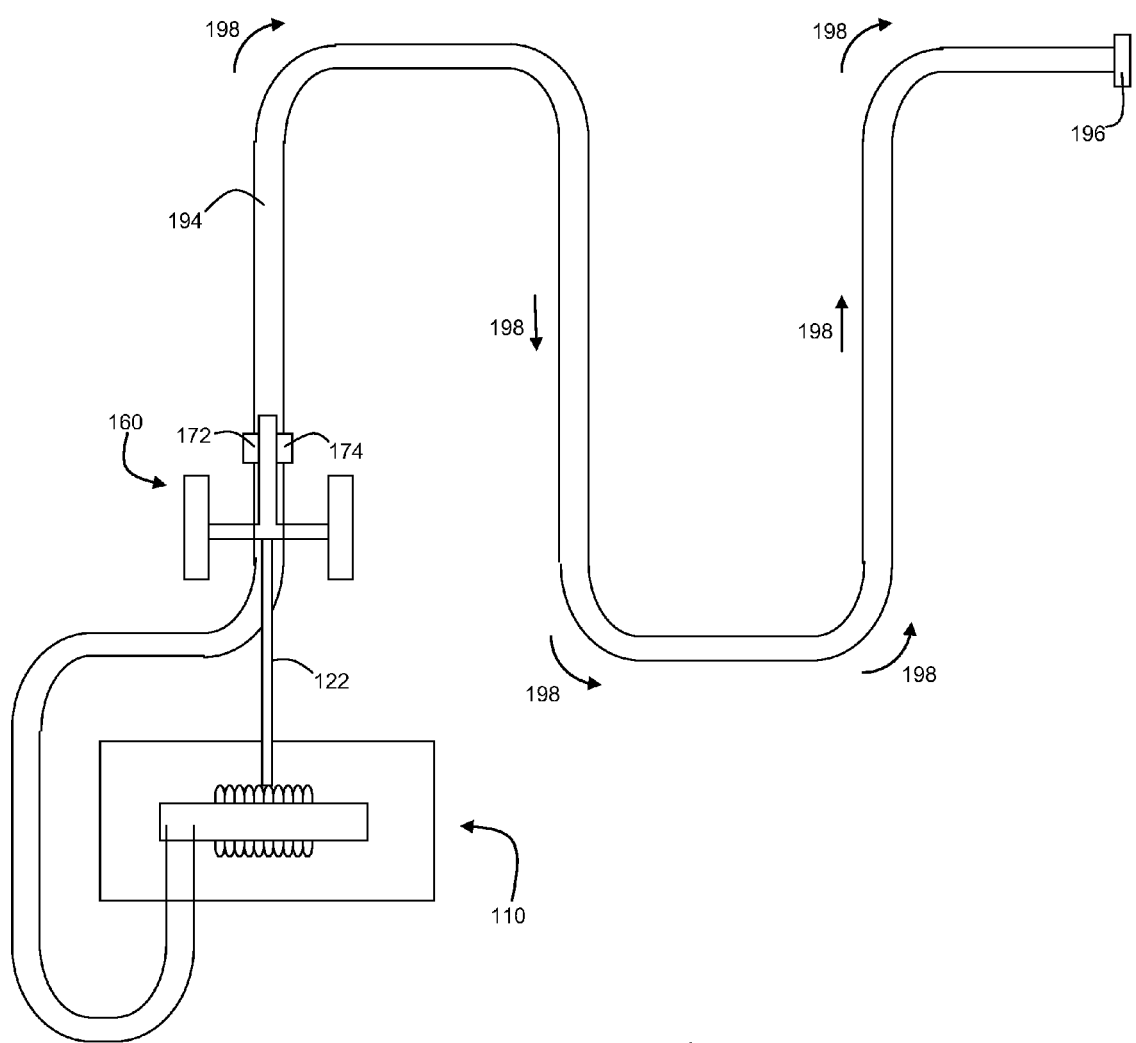
FIG. 4 is a schematic diagram showing a mobile unit of an irrigation system following a path defined by a hose.

FIG. 4 is a schematic diagram showing base unit 110 and mobile unit 160 positioned on a landscape surface to irrigate the surface. As shown in FIG. 4, a hose 194 connects base unit 110 to a water source 196 (e.g., a faucet). Hose 194 is positioned on the landscape surface such that it defines the path that mobile unit 160 follows as it moves forward. In particular, wheels 172 and 174 of mobile unit 160 are positioned on either side of hose 194. As mobile unit 160 moves forward, hose 194 acts as a guide or track for wheels 172 and 174, remain on either side of the hose. Because wheels 172 and 174 rotate freely on axle 173 relative to main body 162, the wheels follow the contours of hose 194, which allows mobile unit 160 to follow a wide variety of linear and nonlinear paths defined by hose 194. As an example, in FIG. 4, hose 194 defines a serpentine path, which is followed by mobile unit 160 as it moves forward in the directions indicated by arrows 198.

The total distance traveled by mobile unit 160 is controlled by the length of fluid conduit 122. Prior to irrigating a landscape, most of the length of fluid conduit 122 is wound around rotating shaft 120. As mobile unit 160 travels in the directions indicated by arrows 198, the mobile unit applies a force to fluid conduit 122, which in turn causes shaft 120 to rotate, releasing additional lengths of fluid conduit 122 while base unit 110 remains stationary. In this manner, the length of unwound fluid conduit 122 extending between base unit 110 and mobile unit 160 increases as the mobile unit follows the path defined by hose 194.

Mobile unit 160 continues to follow the path defined by hose 194 until fluid conduit 122 is fully unwound from shaft 120, at which point further forward motion of mobile unit 160 is prevented by fluid conduit 122. Accordingly, the total path length traveled by mobile unit 160 (i.e., the length of the irrigation path) can be regulated by controlling the length of fluid conduit 122. Typically, fluid conduit 122 has a length of approximately 10 feet or more (e.g., 15 feet or more, 25 feet or more, 50 feet or more, 75 feet or more, 100 feet or more, 200 feet or more, 300 feet or more, 500 feet or more, 1000 feet or more).

After mobile unit 160 has completed its path and/or fluid conduit 122 is fully extended, mobile unit 160 can be returned to base unit 110 by retracting fluid conduit 122. Retraction of fluid conduit 122 can occur with supply water continuing to be delivered to base unit 110. Alternatively, retraction of fluid conduit 122 can be performed after first halting the delivery of supply water to base unit 110 (e.g., by closing a valve in faucet 196). To retract fluid conduit 122, shaft 120 can be rotated in a direction opposite to its direction of rotation during forward motion of mobile unit 160. As discussed previously, handle 128 (shown in FIG. 1) is connected to shaft 120, and the shaft can be rotated in the opposite direction by turning handle 128.

When shaft 120 is rotated to retract fluid conduit 122, the fluid conduit is once again rolled onto shaft 120. Conduit retainers 116 and 118 ensure that fluid conduit 122 is rolled onto, and contained within, the central portion of shaft 120, so that the shaft's rotational motion is not impeded by fluid conduit 122.

A significant advantage of system 100 relative to in-ground irrigation systems is that system 100 typically includes many fewer components that are prone to failure and replacement. For example, components such as plumbing fittings (e.g., sprinklers, joints) can fail after repeated use and may need to be replaced. In-ground irrigation systems typically include many such components, and replacement entails uncovering the failed components by excavating below grade. In contrast, system 100 includes comparatively few such components, and thus, requires significantly less maintenance. Moreover, should a component of system 100 fail, the component can be replaced easily without excavation or troubleshooting to locate failed components that are hidden from view.

Figure 5A:
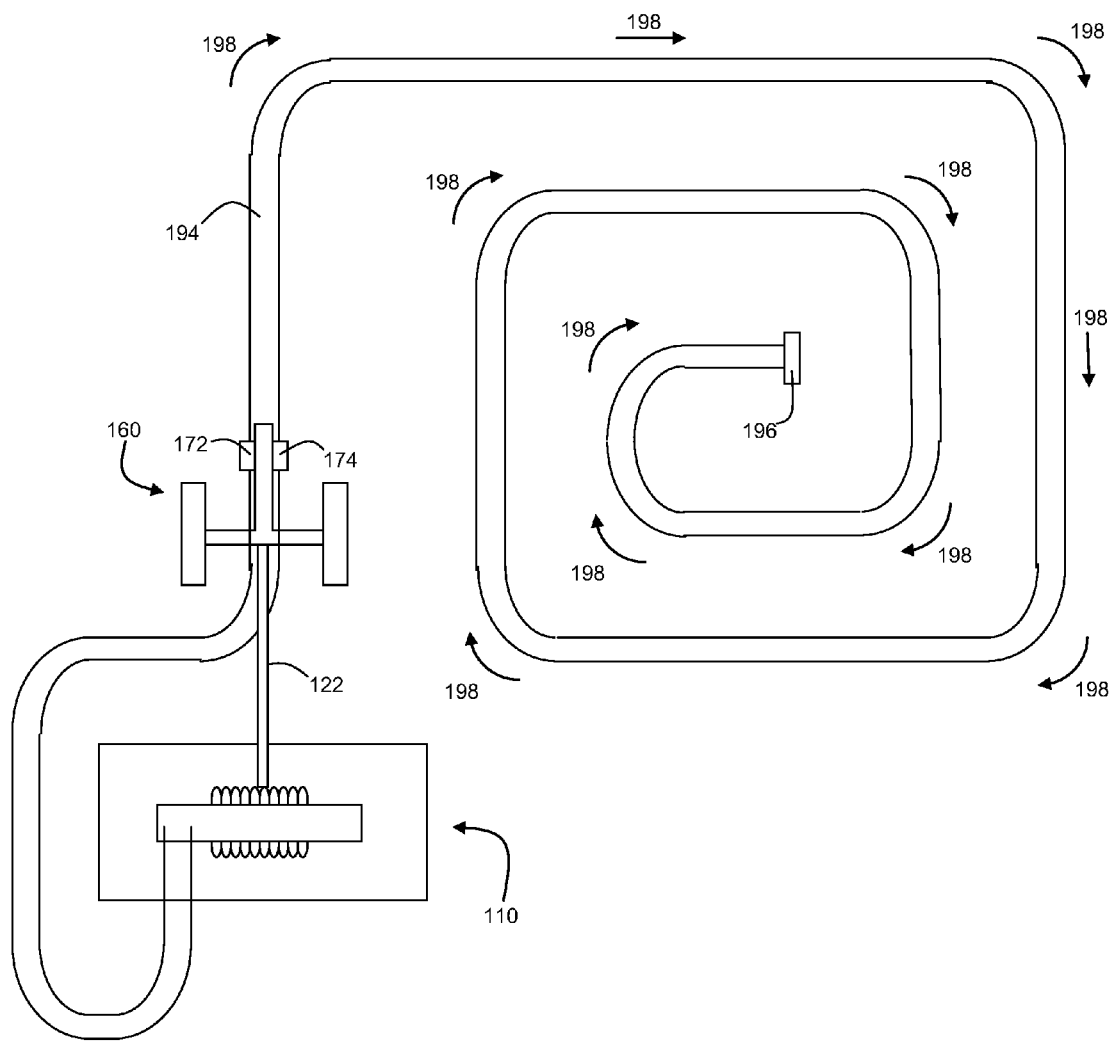
FIG. 5A is a schematic diagram of a circular irrigation path defined by a hose.
Figure 5B:
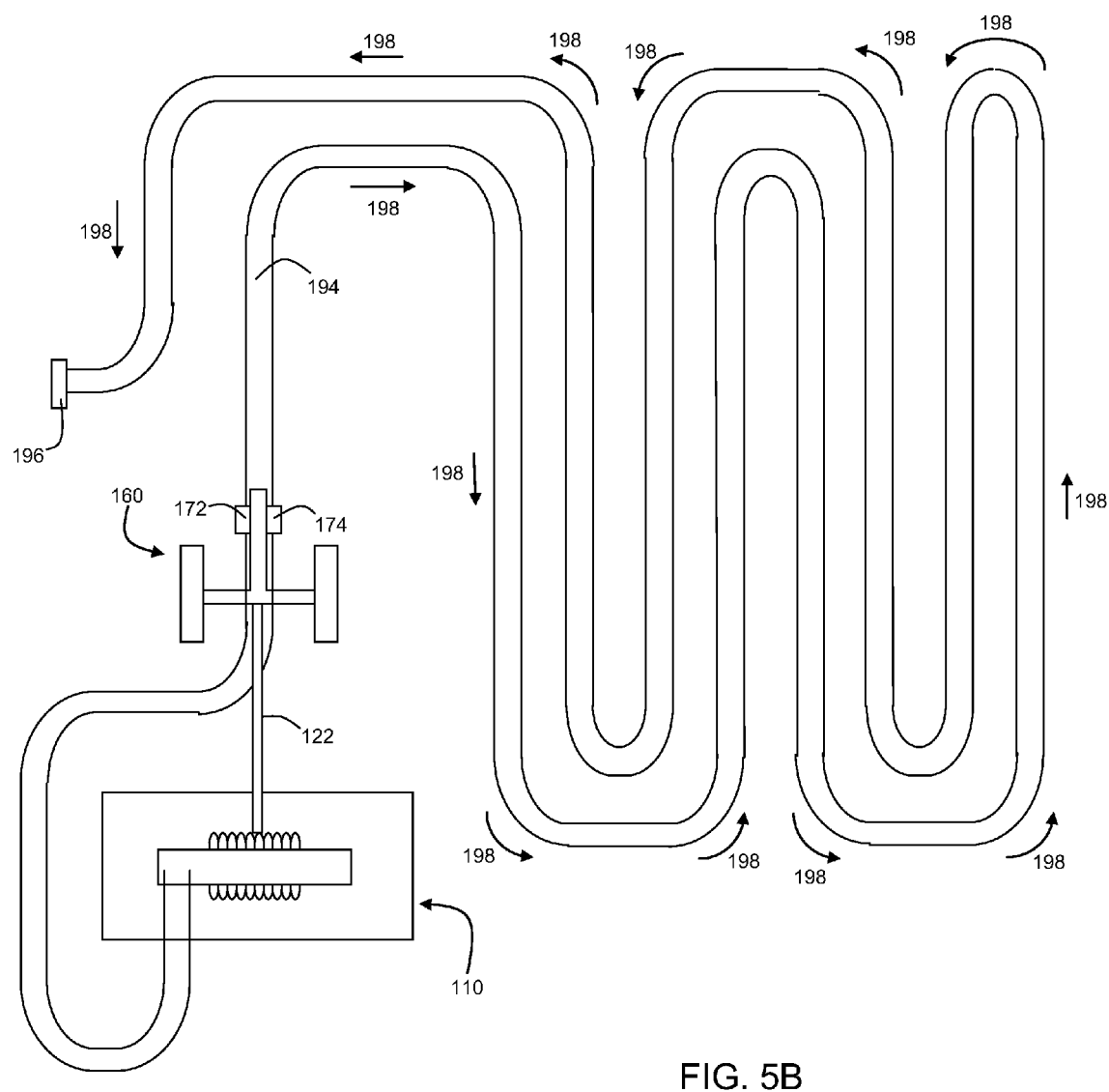
FIG. 5B is a schematic diagram of an interleaved irrigation path defined by a hose.

As discussed above, the irrigation path followed by mobile unit 160 is easily configurable and re-configurable, so that water can be applied to a landscape in a wide variety of patterns. FIG. 4 shows mobile unit 160 following a serpentine pattern defined by hose 194. More generally, however, hose 194 can be positioned to define any desired pattern. FIGS. 5A and 5B show examples of alternate irrigation patterns that can be used, simply by re-positioning hose 194. In FIG. 5A, hose 194 is connected to faucet 196 and is positioned to define a circular irrigation pattern for mobile unit 160. In FIG. 5B, hose 194 is positioned to define an interleaved irrigation pattern for mobile unit 160. The interleaved pattern can be advantageous because the end of the irrigation path is near its beginning (e.g., near the location where mobile unit 160 begins). Accordingly, retrieval of mobile unit 160 after the irrigation path has been traversed is particularly straightforward, as it involves relatively minor displacement of mobile unit 160.

Returning to FIG. 1, upper member 112 and lower member 114 of base unit 110 can be formed from a variety of materials. In some embodiments, for example members 112 and 114 can be formed from pipe, such as polyvinyl chloride (PVC) pipe. Shaft 120, conduit retainers 116 and 118, and handle 128 can be formed from a variety of materials, including various metals and/or various plastic materials. As an example, these components can be formed from PVC pipe.

Support platform 126 is typically formed from one or more materials that are relatively rigid to support the other components of base unit 110. For example, support platform 126 can be formed from wood, from various plastic materials, and/or from various engineered materials such as fiberboard, pressboard, and various laminate materials. In general, the material(s) used for support platform 126 are relatively water resistant, so they do not degrade when exposed to water during irrigation, and relatively heavy to provide stability for base unit 110 (e.g., so that mobile unit 160 does not drag base unit 110 when it moves forward). In some embodiments, support platform 126 can include a plurality of anchors 197 (shown in FIG. 1) that can be inserted below grade (e.g., by hammering or pressing the anchors into the ground) to further prevent movement of base unit 110 when mobile unit 160 moves forward.

To further prevent motion of base unit 110, in some embodiments, lower member 114 can be filled with a heavy material. A variety of common materials can be used for this purpose, including sand, stone dust, and crushed aggregate material.

Fluid conduit 122 is typically formed from a lightweight, flexible tubing material. Examples of materials that can be used to form fluid conduit 122 include latex, silicone, polyethylenes, polyvinyls, polypropylenes, polyurethanes, nylons, and polycarbonates. By selecting a material that is lightweight and flexible, mobile unit 160 is capable of pulling fluid conduit 122 behind it as it moves forward. In contrast, heavier tubing materials such as garden hoses are more difficult for mobile unit 160 to pull, and supply water at higher pressure may be needed to drive the mobile unit's wheels.

The main body 162 of mobile unit 160 can be formed from a variety of lightweight materials. Plastic materials such as PVC pipe are particularly well suited for main body 162. Wheel supports 176 and 178 can be formed from a variety of plastic materials such as PVC, polyethylene, and polypropylene. Wheel supports 176 and 178 can be also be formed from metal materials such as aluminum, brass, and bronze. In some embodiments, rotating sprinkler heads can be used to form wheel supports 176 and 178.

Axle 173 and shaft 175 can generally be formed from various plastic and/or metal materials, including any of the plastic and metal materials disclosed above. Similarly, wheels 168, 170, 172, and 174 can be formed from any of the plastic and/or metal materials disclosed above. In particular, relatively lightweight materials are typically chosen for wheels 168, 170, 172, and 174 to ensure that the wheels do not contribute substantial weight to mobile unit 160. In this manner, only relatively modest supply water pressure is required to drive mobile unit 160 in the forward direction.

Figure 6:
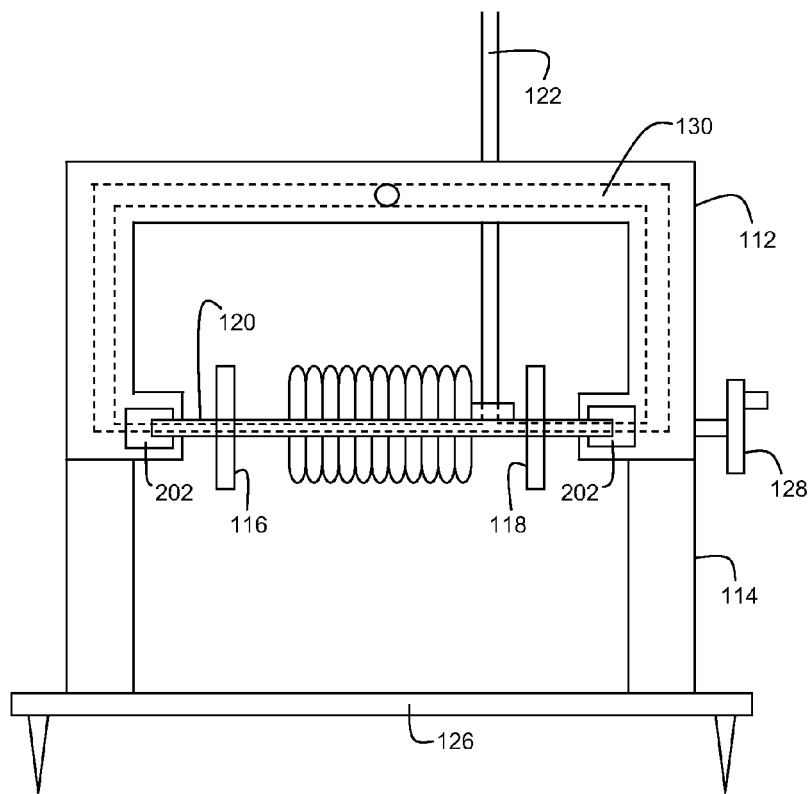
FIG. 6 is a cross-section diagram of a base unit of an irrigation system.

As discussed above, the length of the irrigation path traveled by mobile unit 160 is controlled by the length of fluid conduit 122. Accordingly, in some embodiments, shaft 120 is de-mountable from upper member 112 to allow for spools with different lengths of fluid conduit 122 to be quickly and interchangeably inserted into base unit 110. FIG. 6 shows a schematic cross-sectional diagram of base unit 110. In FIG. 6, shaft 120 releasably engages with locking members 202, which hold shaft 120 in position within upper member 112. To remove shaft 120, the shaft is disengaged from locking members 202, and the entire shaft, conduit retainers 116 and 118, and fluid conduit 122 wound around shaft 120, are removed from upper member 112. Another shaft 120, e.g., with a different length of fluid conduit 122 wound around the shaft, can then be inserted into locking members 202. As such, the length of the path traveled by mobile unit 160 during irrigation can be quickly and easily adjusted. Locking members 202 can use a variety of different mechanisms to engage shaft 120, including multi-armed or -fingered jaws, deformable apertures, pin-type fasteners such as screws or threaded rods, and magnet-based mounts.

In FIG. 1, handle 128 is connected to shaft 120 and used to retract fluid conduit 122 by rotating shaft 120. More generally, a variety of different mechanisms can be used to retract fluid conduit 122. In some embodiments, for example, shaft 120 can be connected to a motorized winch. When mobile unit 160 can reached the end of the irrigation path (e.g., when fluid conduit 122 has been fully unwound from shaft 120), the motorized winch can be activated and can retract conduit 122 by rotating shaft 120. The winch can be activated by a human operator, for example. Alternatively, system 100 can include a sensor that determines when fluid conduit 122 is fully unwound (e.g., by detecting the absence of rotational motion by shaft 120), and activates the motorized winch automatically.

Figure 7:
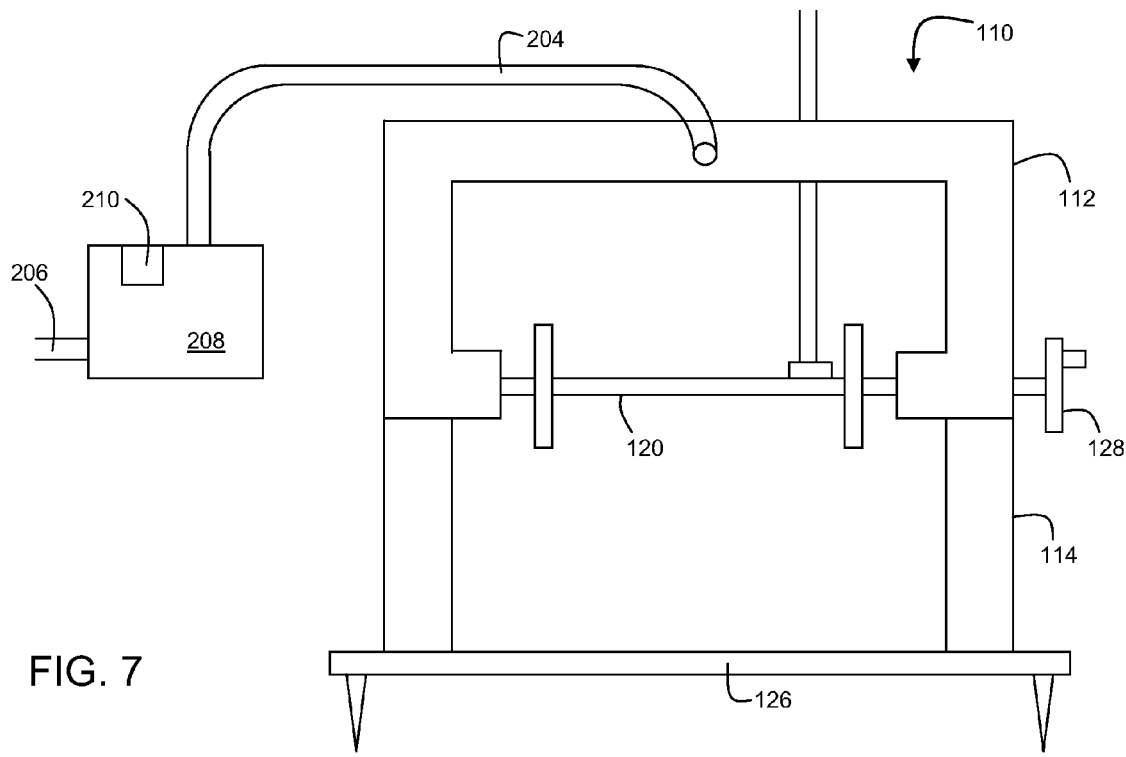
FIG. 7 is a schematic diagram of a base unit that includes a fluid reservoir.

In some embodiments, base unit 110 can include a fluid reservoir that allows other substances to be dispersed by mobile unit 160, in addition to supply water. FIG. 7 shows a schematic diagram of an embodiment of base unit 110 that includes a reservoir 208. Reservoir 208 is connected to upper member 112 by a fluid conduit 204, and is connected to a water source by fluid conduit 206 (e.g., a common garden hose). Reservoir 208 includes an aperture 210 through which compounds in liquid or solid form can be added to the reservoir.

During operation, supply water provided by fluid conduit 206 enters reservoir 208 and mixes with the substances therein. The mixed solution then enters upper member 112 of base unit 110 through fluid conduit 204, and is eventually dispersed onto the landscape through mobile unit 160. A variety of different substances can be added to reservoir 208 for dispersal onto the landscape. These can include, for example, fertilizers, weed killers, vegetation killers, and various other chemical and/or biological substances.

The speed at which mobile unit 160 moves forward depends on the pressure of the water supplied to the mobile unit through fluid conduit 122. In some embodiments, system 100 includes an optional pressure regulator for controlling the pressure of the water entering mobile unit 160 to adjust the speed of mobile unit 160. Referring again to FIG. 1, a pressure regulator 155 is positioned in-line along fluid conduit 122 between base unit 110 and mobile unit 160. Pressure regulator 155 can adjustably decrease the water pressure in conduit 122 to reduce the speed of mobile unit 160, or increase the water pressure in conduit 122 to increase the speed of mobile unit 160. Although positioned along fluid conduit 122 in FIG. 1, pressure regulator 122 can also be located in different positions within system 100. In some embodiments, for example, pressure regular 155 is positioned between hose 125 and aperture 124 to regulate the pressure of supply water before the water enters upper member 112 of base unit 110.

Figure 8:
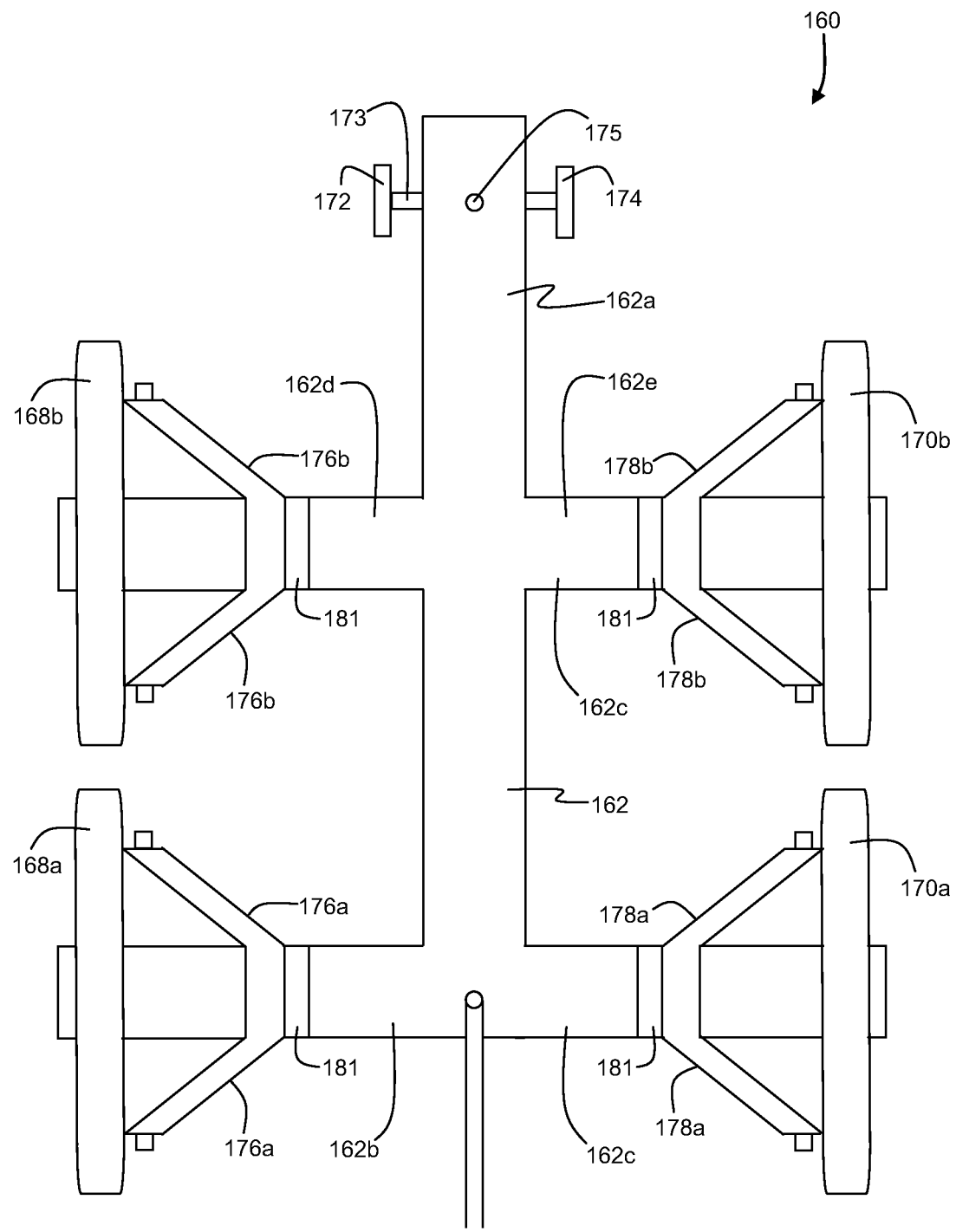
FIG. 8 is a schematic diagram of a mobile unit that includes four drive wheels.

Although mobile unit 160 has two larger wheels 168 and 170, and two smaller wheels 172 and 174, in FIG. 1, more generally, mobile unit 160 can include different wheel configurations for enhanced stability, particularly when traveling over rougher landscapes. FIG. 8 is a schematic diagram showing an embodiment of mobile unit 160 that includes four large wheels 168a, 168b, 170a, and 170b. The large wheels are connected to main body 162 through wheel supports 176a, 176b, 178a, and 178b, respectively. Water that enters main body 162 through aperture 182 flows through each of wheel supports 176a, 176b, 178a, and 178b through a common interior fluid channel that extends through neck 162a and arms 162b, 162c, 162d, and 162e of main body 162, and into wheel supports 176a, 176b, 178a, and 178b, in a manner analogous to fluid channel 180 in FIG. 1. During operation, water emerges from mobile unit 160 through apertures at the ends of each of wheel supports 176a, 176b, 178a, and 178b, and through apertures 188 formed in neck 162a, as described previously.

Figure 9:
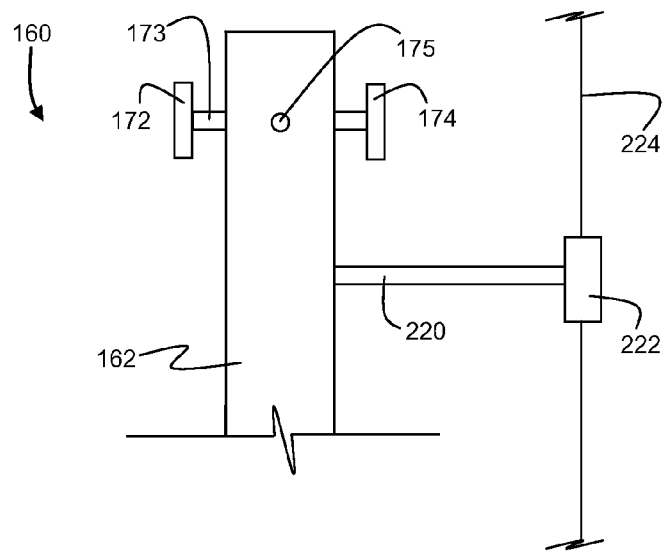
FIG. 9 is a schematic diagram of an alternate guide system for the mobile unit.

Although in the preceding discussion a hose (e.g., hose 194) was used to define the irrigation path followed by mobile unit 160, more generally other guiding mechanisms can be used to define the irrigation path. FIG. 9 shows a schematic diagram of a mobile unit 160 configured for operation with an alternate guiding mechanism. In FIG. 9, a support member 220 and guide block 222 are attached to the main body 162 of mobile unit 160. Guide block 222 is dimensioned to engage with guide member 224. When mobile unit 160 is driven forward by supply water, guide block 222 and support member 220 ensure that a fixed relationship is maintained between mobile unit 160 and guide member 224. In this manner, guide member 224 defines the irrigation path followed by mobile unit 160.

Guide member 224 can be implemented in various ways. In some embodiments, for example, guide member 224 can be implemented as a guide wire, either at grade level or elevated above the ground. The guide wire can be positioned relative to a landscape in a manner similar to hose 194 to define a desired irrigation pattern. Alternatively, in certain embodiments, guide member 224 can be implemented as a system of rails, tracks, or other similar members, to define an irrigation pathway for mobile unit 160. Systems of guide wires can be used, for example, to define irrigation patterns for crop-bearing fields, allowing mobile unit 160 to efficiently and quickly deliver water to the plants themselves, and preventing delivery of water to portions of the field between rows of plants.

Figure 10:
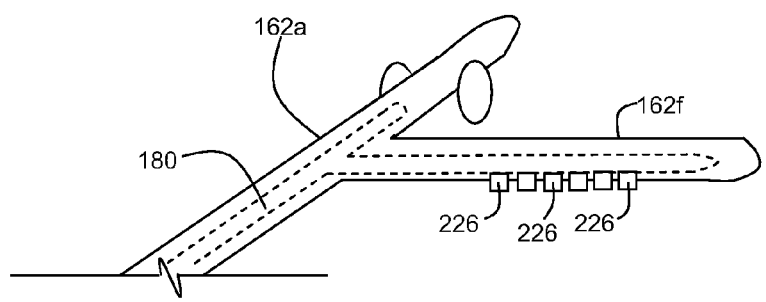
FIG. 10 is a schematic diagram of a mobile unit with an additional lateral arm.

As shown in FIG. 1, mobile unit 160 delivers water in a downward spray pattern through a series of apertures 188 on the underside of neck 162a. In some embodiments, mobile unit 160 can include additional arms for delivering water, and in particular, for delivering water in a downward spray pattern. Moreover, by including additional arms, water can be delivered to one side or the other of mobile unit 160. FIG. 10 is a schematic diagram showing a portion of mobile unit 160. In FIG. 10, an additional arm 162f extends laterally from neck 162a (i.e., in a direction parallel to arm 162c in FIG. 1). Fluid conduit 180 extends into arm 162f and terminates in a series of apertures 226. During operation of mobile unit 160, water is sprayed in a downward pattern onto the landscape through apertures 226.

Arm 162f can be implemented in addition to, or as an alternative to, apertures 188 on the underside of neck 162a. Thus, water delivery can occur from both neck 162a and arm 162f, or from arm 162f alone. The configuration shown in FIG. 10 can be particularly advantageous for delivering water to one side of mobile unit 160, such as when watering crops or other plants arranged in rows, e.g., in a field. Although mobile unit 160 includes a single additional arm 162f in FIG. 10, more generally, mobile unit 160 can include one or more additional arms, each configured to deliver water in a downward spray pattern similar to arm 162f in FIG. 10. The additional arms can extend from either side of main body 162, or from both sides of the main body.

Figure 11:
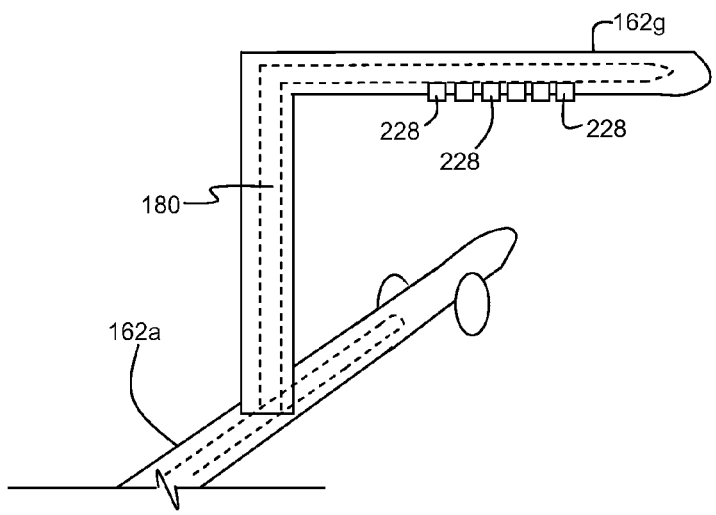
FIG. 11 is a schematic diagram of a mobile unit with an elevated lateral arm.

In some embodiments, mobile unit 160 can include elevated arms. FIG. 11 is a schematic diagram showing a portion of a mobile unit 160 in which an additional arm 162g extends upward and laterally from neck 162a. Fluid conduit 180 extends into arm 162g and terminates in a series of apertures 228. During operation of mobile unit 160, water is sprayed in a downward pattern on the landscape through apertures 228.

Elevated arms such as arm 162g can be implemented in addition to, or as alternatives to, lateral arms such as arm 162f, and apertures 188 in neck 162a. As such, water can be delivered in a downward spray from various heights above the landscape surface. As described above in connection with FIG. 10, elevated arms such as arm 162 g can be positioned on one or both sides of main body 162.

Mobile units with elevated arms such as arm 162g can be particularly useful for irrigating crops and other plants that are relatively tall. For example, a mobile unit such as unit 160 in FIG. 11 can be used to irrigate such plants, where other mobile units might instead collide with the plants due to their height above grade.

Other Embodiments

A number of embodiments have been described. Nevertheless, it will be understood that various modifications may be made without departing from the spirit and scope of the disclosure. Accordingly, other embodiments are within the scope of the following claims.

What is claimed is:

1. An irrigation system, comprising:
a base unit comprising a retractable fluid conduit; and
a mobile unit coupled to the fluid conduit and comprising:
    a main body comprising an internal fluid channel having an opening;
    a plurality of wheel supports rotatably coupled to the main body, wherein the internal fluid channel extends through the wheel supports to a first plurality of apertures;
    two or more wheels coupled to the plurality of wheel supports; and
    a second plurality of apertures extending from the internal fluid channel through a wall of the main body,
wherein during operation of the irrigation system, water enters the internal fluid channel through the opening and is dispensed from the first and second pluralities of apertures.

2. The system of claim 1, further comprising an impeller coupled to each one of the two or more wheels through a subset of the plurality of wheel supports, wherein during operation of the irrigation system, the water propels the mobile unit by applying a force to each impeller.

3. The system of claim 2, wherein the mobile unit comprises a guide channel, and wherein during operation of the irrigation system, the mobile unit follows a guide member positioned in the guide channel.

4. The system of claim 1, wherein the second plurality of apertures are positioned so that during operation of the irrigation system, water is dispersed in a downward direction onto a landscape surface from the second plurality of apertures.

5. The system of claim 1, wherein the retractable fluid conduit comprises a flexible tube.

6. The system of claim 1, wherein the base unit comprises a retracting mechanism for storing the fluid conduit in retracted form.

7. The system of claim 6, wherein the retracting mechanism comprises a rotating shaft around which the fluid conduit is wound.

8. The system of claim 6, wherein the base unit comprises a member with an internal fluid channel, and wherein the retracting mechanism is detachably coupled to the member.

9. The system of claim 8, wherein the internal fluid channel in the base unit extends from the member through the retracting mechanism and into the fluid conduit.

10. The system of claim 1, further comprising a pressure regulator configured to control a pressure of the water.

11. The system of claim 8, further comprising a fluid reservoir connected to the internal fluid channel of the base unit, wherein during operation of the irrigation system, the water flows through the fluid reservoir before entering the internal fluid channel of the base unit.

12. The system of claim 3, wherein the guide channel is formed by two guide wheels spaced apart from one another.

13. The system of claim 12, wherein the guide member comprises a hose.

14. The system of claim 3, wherein the guide member comprises one or more guide wires.

15. An irrigation system, comprising:
a stationary base unit;
a fluid conduit connected to the base unit; and
a mobile unit connected to the fluid conduit and comprising:
    a plurality of wheel supports;
    two or more drive wheels, wherein each of the drive wheels is attached to a corresponding one of the wheel supports;
    a fluid channel extending from each of the drive wheels through the plurality of wheel supports; and
    two or more guide wheels,
wherein during operation of the irrigation system:
    water supplied from the base unit enters the fluid channel of the mobile unit, propels the two or more drive wheels, and at least a portion of the water is dispensed from a first plurality of apertures located in the wheel supports at locations along a circumference of the two or more drive wheels; and
    the mobile unit follows a path corresponding to a hose positioned between the two or more guide wheels.

16. The system of claim 15, further comprising two or more impellers, wherein each one of the two or more impellers is connected to a corresponding one of the two or more drive wheels, and wherein each of the two or more impellers is positioned within the fluid channel.

17. The system of claim 15, further comprising a second plurality of apertures different from the first plurality of apertures and connected to the fluid conduit, wherein during operation of the irrigation system, a portion of the water is dispensed from the second plurality of apertures.

18. The system of claim 17, wherein at least some of the second plurality of apertures are positioned on an underside of the mobile unit.

19. The system of claim 15, wherein the base unit comprises a retracting mechanism for storing the fluid conduit in retracted form, and wherein during operation of the irrigation system, the retracting mechanism dispenses the fluid conduit as the mobile unit follows the path.

20. The system of claim 16, wherein each one of the two or more impellers is connected to a corresponding one of the two or more drive wheels through the plurality of wheel supports.

* * * * *